United States Patent
Yang et al.

(10) Patent No.: US 9,703,269 B2
(45) Date of Patent: Jul. 11, 2017

(54) METHOD AND APPARATUS FOR SETTING SNOOZE INTERVAL IN MOBILE DEVICE

(71) Applicant: Samsung Electronics Co., Ltd., Suwon-si, Gyeonggi-do (KR)

(72) Inventors: Chulhyung Yang, Gumi-si (KR); Sungjun Kim, Buk-gu (KR); Gyucheol Choi, Gumi-si (KR); Eunyeung Lee, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/154,713

(22) Filed: Jan. 14, 2014

(65) Prior Publication Data

US 2014/0198628 A1 Jul. 17, 2014

(30) Foreign Application Priority Data

Jan. 17, 2013 (KR) .......................... 10-2013-0005223

(51) Int. Cl.
*G04G 13/02* (2006.01)
*H04M 1/725* (2006.01)

(52) U.S. Cl.
CPC ........... *G04G 13/021* (2013.01); *G04G 13/02* (2013.01); *G04G 13/025* (2013.01); *G04G 13/026* (2013.01); *H04M 1/72566* (2013.01)

(58) Field of Classification Search
CPC .... G04G 13/02; G04G 13/021; G04G 13/025; G04G 13/026
USPC .................................. 368/73, 250, 262, 263
See application file for complete search history.

(56) References Cited

U.S. PATENT DOCUMENTS

| | | | |
|---|---|---|---|
| 6,477,117 B1* | 11/2002 | Narayanaswami et al. | 368/251 |
| 2003/0137541 A1* | 7/2003 | Massengale et al. | 345/764 |
| 2003/0225602 A1* | 12/2003 | Hagmann | G06Q 10/0631 705/301 |
| 2005/0233777 A1* | 10/2005 | Twerdahl | 455/567 |
| 2005/0237862 A1 | 10/2005 | Choi | |
| 2006/0007785 A1* | 1/2006 | Fernandez et al. | 368/250 |
| 2007/0229517 A1* | 10/2007 | May et al. | 345/501 |
| 2008/0180408 A1* | 7/2008 | Forstall | G06F 3/0482 345/177 |
| 2009/0127248 A1* | 5/2009 | Itou | H05B 6/062 219/489 |
| 2009/0271731 A1* | 10/2009 | Lin | G06F 3/04883 715/776 |
| 2010/0048194 A1* | 2/2010 | Park et al. | 455/418 |
| 2010/0184484 A1* | 7/2010 | Lindberg et al. | 455/566 |

(Continued)

FOREIGN PATENT DOCUMENTS

| | | |
|---|---|---|
| EP | 1 589 385 A2 | 10/2005 |
| JP | 2007-309809 A | 11/2007 |
| WO | 2009012820 A1 | 1/2009 |

*Primary Examiner* — Amy Cohen Johnson
*Assistant Examiner* — Daniel Wicklund
(74) *Attorney, Agent, or Firm* — Jefferson IP Law, LLP (57) ABSTRACT

A method and an apparatus for easily setting a snooze interval in a mobile device are provided. In the method, the mobile device receives an event for setting a snooze function, outputs, when receiving the event, a plurality of display regions respectively corresponding to a plurality of snooze intervals, and selects one display region of the plurality display regions. Then the mobile device sets the snooze function with a specific snooze interval corresponding to the selected one display region.

19 Claims, 10 Drawing Sheets

(56) References Cited

U.S. PATENT DOCUMENTS

| | | | |
|---|---|---|---|
| 2010/0192105 A1* | 7/2010 | Kim et al. | 715/834 |
| 2010/0309754 A1* | 12/2010 | Coffaro | G04G 13/02 368/109 |
| 2011/0191675 A1* | 8/2011 | Kauranen | 715/702 |
| 2012/0120773 A1* | 5/2012 | O'Toole | 368/73 |
| 2012/0242584 A1* | 9/2012 | Tuli | G06F 3/016 345/173 |
| 2012/0306772 A1* | 12/2012 | Tan | G06F 3/04842 345/173 |
| 2013/0033436 A1* | 2/2013 | Brinda et al. | 345/173 |
| 2013/0044072 A1* | 2/2013 | Kobayashi | H04M 1/0237 345/173 |
| 2013/0148474 A1* | 6/2013 | Lee et al. | 368/73 |
| 2013/0170324 A1* | 7/2013 | Tu et al. | 368/28 |
| 2013/0339905 A1* | 12/2013 | Liu | G06F 17/30312 715/835 |
| 2014/0026105 A1* | 1/2014 | Eriksson et al. | 715/863 |
| 2014/0073299 A1* | 3/2014 | Ham | H04W 4/023 455/414.3 |

* cited by examiner

METHOD AND APPARATUS FOR SETTING SNOOZE INTERVAL IN MOBILE DEVICE

CROSS-REFERENCE TO RELATED APPLICATION(S)

This application claims the benefit under 35 U.S.C. §119(a) of a Korean patent application filed on Jan. 17, 2013 in the Korean Intellectual Property Office and assigned Serial number 10-2013-0005223, the entire disclosure of which is hereby incorporated by reference.

TECHNICAL FIELD

The present disclosure relates to a function of a mobile device. More particularly, the present disclosure relates to a method and apparatus for easily setting a snooze interval in a mobile device.

BACKGROUND

With a remarkable growth of technologies related to mobile devices, an increasing variety of mobile devices have become popular. Currently, such mobile devices have outgrown their respective traditional fields and have reached a stage where diverse functions are performed on the mobile device. For example, mobile devices may offer many helpful functions, including a voice call function, a video call function, a message transmission function, a wireless Internet function, an alarm function, a scheduler function, and the like. Among them, the alarm function is designed to wake a user at a specific time and/or inform a user of an occurrence of a previously designated time through an alarm sound and/or vibration.

Normally, in addition to an alarm function, a mobile device has a snooze function that frequently outputs an alarm signal at regular intervals after the occurrence of an alarm at a specific time. If a certain alarm and snooze settings have been already set, then upon the occurrence of the alarm, a user can either cancel or ignore the alarm. In the latter case, a snooze function is maintained even after the end of the current alarm. A user who desires to change the snooze interval, during the output of the alarm signal, may cancel the existing snooze settings and then set again a new snooze interval. For example, if an alarm with a snooze interval of five minutes happens at six o'clock and if the user wants to receive the next alarm after ten minutes, he or she may cancel an existing snooze setting and then conduct a reset process. Unfortunately, this requires complicated manipulations such as executing a menu item for an alarm and the snooze function and then resetting an alarm and a snooze interval.

Accordingly there is a need for an improved method and system that apparatus for easily setting a snooze interval in a mobile device when an alarm happens.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for easily setting a snooze interval in a mobile device when an alarm happens.

In accordance with an aspect of the present disclosure, a method for setting a snooze interval in a mobile device is provided. The method includes receiving an event for setting a snooze function, outputting, when receiving the event, a plurality of display regions respectively corresponding to a plurality of snooze intervals, selecting one display region of the plurality of display regions, and setting the snooze function with a specific snooze interval corresponding to the selected one display region.

In accordance with another aspect of the present disclosure, an apparatus for setting a snooze interval in a mobile device is provided. The apparatus includes a touch screen configured to receive a touch event for setting a snooze function and to display a plurality of display regions respectively corresponding to a plurality of snooze intervals, and a control unit configured to control the touch screen to output, when receiving the event, the plurality of display regions respectively corresponding to the plurality of snooze intervals, to select one display region of the plurality of display regions, and to set the snooze function with the a specific snooze interval corresponding to the selected one display region.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a display region" includes reference to one or more of such display regions.

Figure 1:
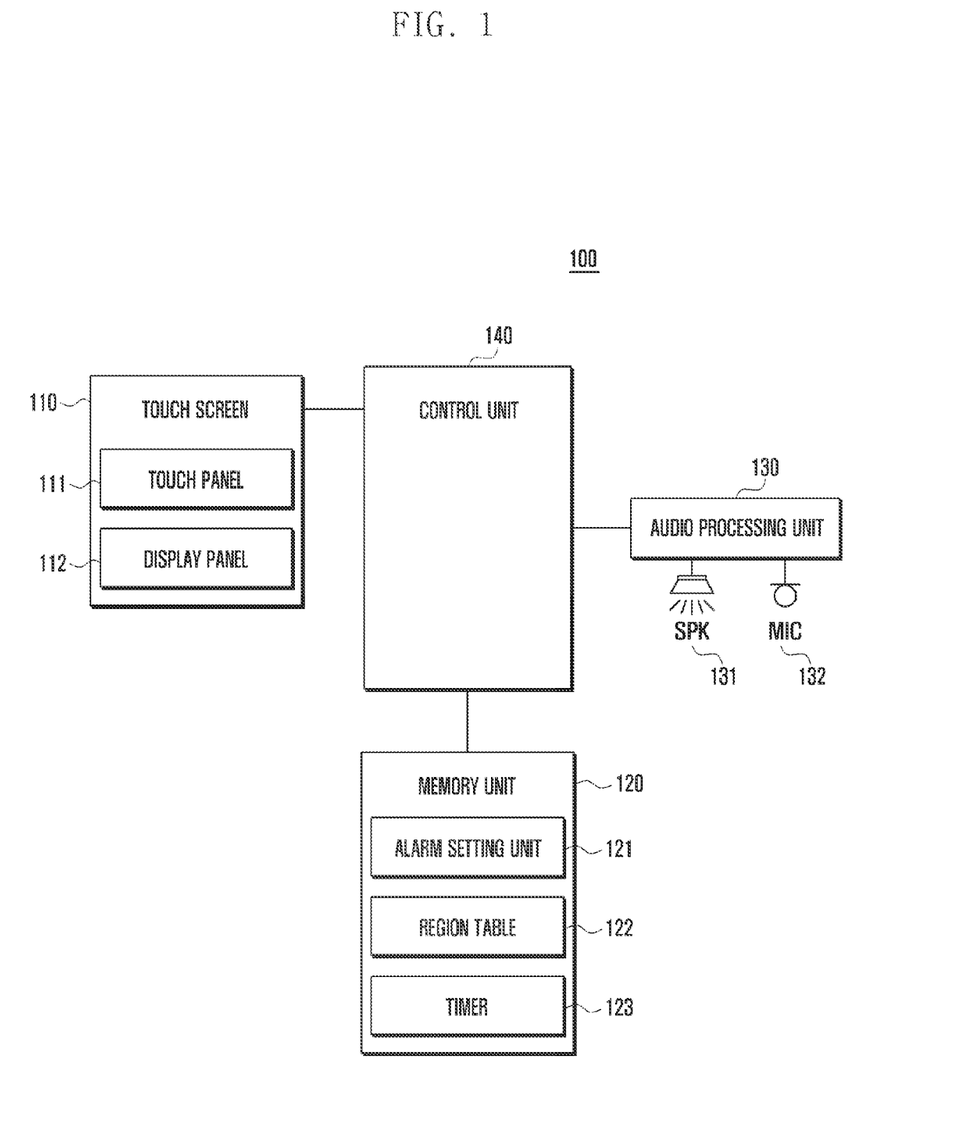
FIG. 1 is a block diagram illustrating a mobile device according to an embodiment of the present disclosure.

FIG. 1 is a block diagram illustrating a mobile device according to an embodiment of the present disclosure.

Referring to FIG. 1, the mobile device 100 may include a touch screen 110, a memory unit 120, an audio processing unit 130, and a control unit 140.

The touch screen 110 may be configured to have a touch panel 111 and a display panel 112. The touch panel 111 may be placed on the display panel 112. Specifically, the touch panel 111 may be disposed on the display panel 112 (i.e., referred to as add-on type) or inserted in the display panel 112 (i.e., referred to as on-cell type or in-cell type).

The touch panel 111 may create a touch event in response to contact by a user's finger or the like thereon, and transfer the created touch event to the control unit 140. Namely, the touch panel 111 may provide coordinates contained in a touch region (i.e., a specific region touched by a touch tool such as a user's finger or a stylus pen) to the control unit 140, which may determine touch coordinates from at least one of coordinates contained in a touch region. The control unit 140 may detect a user's gesture on the basis of variations in touch coordinates continuously received from the touch panel 111. A user's gesture may include and be classified into a touch, a tap, a drag, a long touch, a touch release, a flick, and the like. A touch refers to a gesture to make a touch tool be in contact with any point on the touch panel 111. A tap refers to a gesture to touch any point on the touch panel 111 and then promptly release a touch tool from the touch point without moving the touch tool. A drag refers to a gesture to move a touch tool in an arbitrary direction while maintaining a touch on the touch panel 111. A long touch refers to a gesture to touch any point on the touch panel 111 for a while. A touch release refers to a gesture to remove a touch from any point on the touch panel 111. A flick refers to a gesture to move a touch tool more quickly than a drag and then release the touch tool.

The touch panel 111 may be a complex touch panel that is composed of a finger touch panel for detecting a finger gesture and a pen touch panel for detecting a pen gesture. The finger touch panel may be formed of a capacitive type, a resistive type, an infrared type, or an ultrasonic type. The finger touch panel may create a touch event by a user's finger gesture or any other equivalent (e.g., an action of a conductive tool capable of causing a change in capacitance). Meanwhile, the pen touch panel may be formed of an electromagnetic induction type. Therefore, the pen touch panel may create a touch event by a stylus pen which is specially produced to form a magnetic field.

The display panel 112 may display various menu items of the mobile device 100, information entered by a user, or information offered to a user. Particularly, in various embodiments of this disclosure, the display panel 112 may display an alarm screen and subsequent various snooze-setting screens. Specifically, in case a certain alarm and a related snooze setting are previously set, the display panel 112 may display a screen containing an alarm cancel icon and a snooze reset icon when an alarm time occurs. Herein, an alarm cancel icon is linked to an alarm cancel function, and a snooze reset icon is linked to a snooze reset function. In the above case, if an alarm cancel icon is selected, an alarm function and a snooze function are canceled, and also, an alarm output signal is stopped. If a snooze reset icon is selected, the display panel 112 may display a plurality of display regions for setting a new snooze interval. These display regions may have various shapes such as a circle, an ellipse, a quadrangle, and the like. In one embodiment, respective display regions may be arranged in an adjoining form as if concentric circles having different sizes are overlapped for example. In another embodiment, respective display regions may be separated from each other. Hereinafter, such display regions will be referred to as the first region to the n-th region. Further, the remaining region other than such display regions will be referred to a background region.

When a snooze reset icon is touched, the display panel 112 may display thereon, the first region to the n-th region and a background region together with boundaries thereof. For improved distinction between adjacent regions, the respective boundaries may be displayed with different colors. If a touch on the snooze reset icon is dragged, the display panel 112 may display different colors in the respective regions and also display numbers indicating snooze intervals in the respective regions. In another embodiment, if a touch is maintained on the background region for a given duration after a drag from the snooze reset icon, the display panel 112 may further display a default snooze interval or a variable snooze interval that increases in proportion to a touch duration from an initial snooze interval corresponding to the background region. Here, the default snooze interval may refer to a specific snooze interval defined by a designer's setting or initially selected by a user's setting.

Meanwhile, the display panel 112 may be formed of Liquid Crystal Display (LCD), Light Emitted Diode (LED), Organic LED (OLED), Active Matrix OLED (AMOLED), Passive Matrix OLED (PMOLED), or the like.

The memory unit 120 may act as a secondary memory unit of the control unit 140 and include a disk, RAM, ROM, flash memory, and the like. The memory unit 120 may store data created in the mobile device 100 or received from any external device such as a server, desktop PC, a tablet PC, etc. via a wireless communication unit (not shown) or an external device interface unit (not shown) under the control of the control unit 140. Particularly, the memory unit 120 may store an alarm setting unit 121, a region table 122, and a timer 123.

The alarm setting unit 121 may store an alarm time, an alarm repeat rule, an alarm type, an alarm sound, and information about a snooze setting. Specifically, an alarm repeat rule may include information about a day of the week designated for a periodical alarm, and an alarm type may include about information about a ringtone or a vibration. In case an alarm type is a ringtone type, an alarm sound refers to information about a specific ringtone selected by a user. Also, information about a snooze setting may include information about a default snooze interval and a snooze frequency. A default snooze interval may refer to a specific snooze interval defined by a designer's setting or initially selected by a user's setting.

The region table 122 may record a snooze reset icon, the first region to the n-th region, and the background region, which are respectively linked to touch coordinates. Further, the region table 122 may record snooze intervals respectively corresponding to such regions. When specific touch coordinates are determined from a touch event, the control unit 140 may identify a specific region linked to the touch coordinates among the first region to the n-th region and the background region and further identify a specific snooze interval corresponding to the specific region from the region table 122. Then the control unit 140 may control the display panel 112 to display the specific region with a semitransparent color and to further display the specific snooze interval.

The timer 123 may create necessary time data under the control of the control unit 140. Such time data may be used for a count operation. For example, if a user touches the background region for a specific time, the timer 123 may be used for allowing a snooze interval to increase in proportion to the specific touch duration.

Additionally, the memory unit 120 may store a booting program, an Operating System (OS), and a variety of applications required for various optional functions such as a sound reproduction function, an image or video playback function, or a broadcasting play function. Further, the memory unit 120 may store user data and any other data transmitted or received. Particularly, the memory unit 120 may store a snooze reset program, which may include a routine for displaying the first region to the n-th region, the background region, and snooze intervals in response to a touch input, a routine for selecting a specific region among the first region to the n-th region in response to a drag input, a routine for increasing a snooze interval in response to a touch input for a specific duration, and a routine for setting a snooze interval on the basis of the selected region or the increased snooze interval.

The audio processing unit 130 may perform a function to transmit an audio signal received from the control unit 140 to a Speaker (SPK) 131 and a function to deliver an audio signal received from a Microphone (MIC) 132 to the control unit 140. Namely, the audio processing unit 130 may convert and output voice/sound data into audible sound through the SPK 131 under the control of the control unit 140, and also convert an audio signal received from the MIC 132 into a digital signal and transfer it to the control unit 140. Particularly, in case an alarm and snooze function is set in an embodiment, the audio processing unit 130 may output a specific alarm sound when an alarm time occurs. Additionally, based on a snooze frequency, the audio processing unit 130 may repeatedly output such a specific alarm sound whenever a time corresponding to a snooze interval occurs.

The control unit 140 may control the whole operation of the mobile device 100, control signal flows between internal components of the mobile device 100, perform data processing, and control the supply of power from a battery to the respective components. Additionally, the control unit 140 may selectively execute various application stored in the memory unit 120. Particularly, the control unit 140 may execute a snooze reset program to simply reset a snooze interval at the occurrence of an alarm. Now, a function of the control unit 140 will be described in detail with reference to drawings.

Figure 2A:
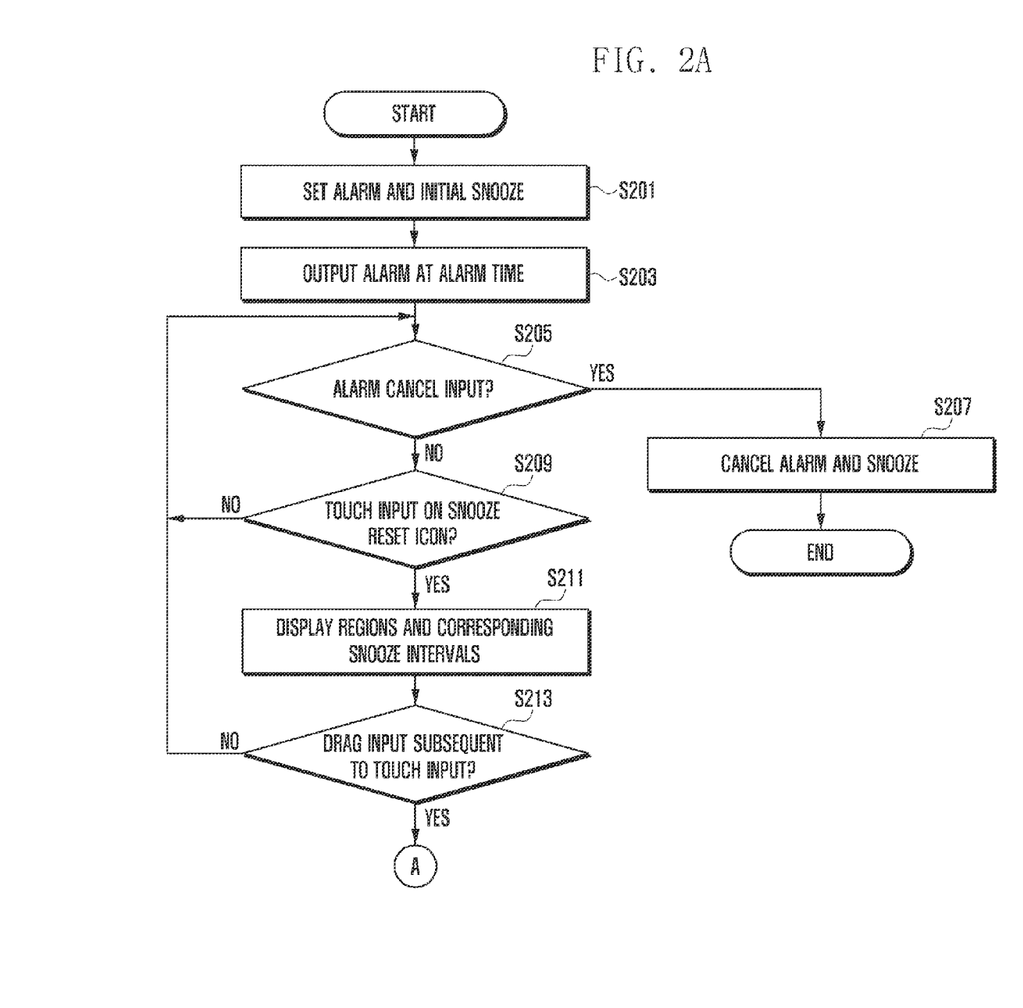
FIGS. 2A and 2B are flow diagrams illustrating a method for setting a snooze interval according to an embodiment of the present disclosure.
Figure 2B:
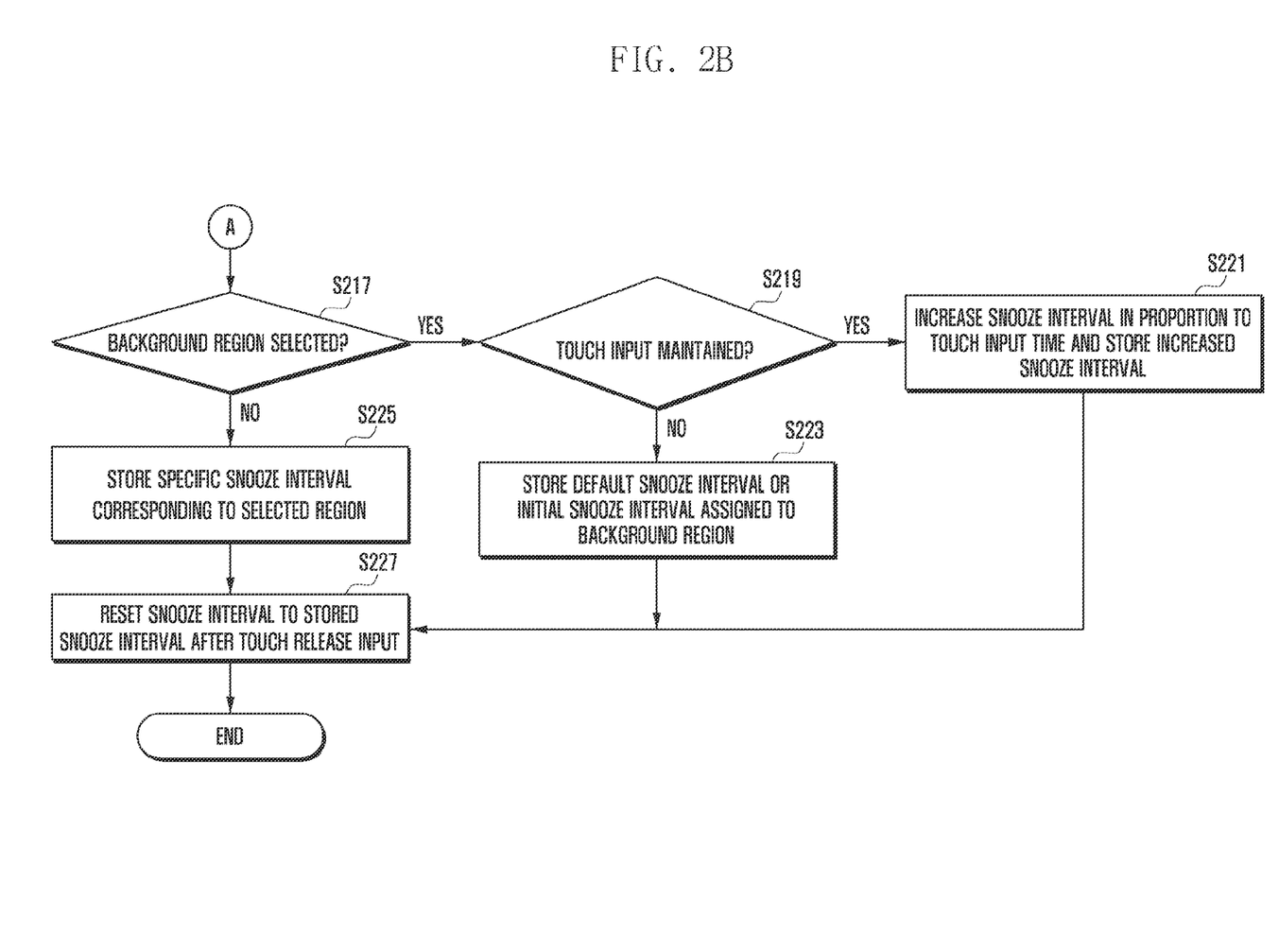

FIGS. 2A and 2B are flow diagrams illustrating a method for setting a snooze interval according to an embodiment of the present disclosure.

Referring to FIGS. 2A and 2B, at operation S201, the control unit 140 may receive a user's touch input for setting an alarm and an initial snooze. An alarm setting may include settings for an alarm time, an alarm repeat rule, an alarm type, an alarm sound, and the like. A setting for an initial snooze may include settings for a default snooze interval, a snooze frequency, and the like. In an embodiment, a default snooze interval and a snooze frequency may have different items set in advance by a designer or by a user. For example, one item may be determined as a default snooze interval of five minutes and a snooze frequency of three times, and another item may be determined as a default snooze interval of ten minutes and a snooze frequency of five times. Additionally, a user may set respective snooze intervals that correspond to the first region to the n-th region and the background region. For example, a user may set that a default snooze interval is three minutes, a snooze interval linked to the first region is five minutes, a snooze interval linked to the second region is ten minutes, and a snooze interval linked to the third region is fifteen minutes. The background region may be set to be twenty minutes or a default snooze interval.

At operation S203, the control unit 140 may output an alarm signal when an alarm time occurs. Specifically, the control unit 140 may receive, from the alarm setting unit 121, information about an alarm type and an alarm sound previously set at operation S201. The control unit 140 may control the audio processing unit 130 to output an alarm sound and also control the touch screen 110 to display thereon an alarm cancel icon and a snooze reset icon.

At operation S205, the control unit 140 may determine whether an input for canceling an alarm is received while the alarm signal is being outputted. An alarm cancel input may refer to a drag input subsequent to a touch input on an alarm cancel icon. When an alarm cancel input is received ('YES'), at operation S205, the control unit 140 may cancel an alarm function as well as a snooze function at operation S207.

If no input for canceling an alarm is received while an alarm is outputted ('NO'), at operation S205, the control unit 140 may determine at operation S209 whether a touch input on a snooze reset icon is received. If there is no touch input from a snooze reset icon or if any touch input is received from any part other than a snooze reset icon ('NO'), at operation S209, the control unit 140 may return to operation S203. Otherwise, if a touch input is received from a snooze reset icon ('YES'), at operation S209, the control unit 140 may control the touch screen 110 to display a plurality of display regions and corresponding snooze intervals at operation S211. Namely, the touch screen 110 may display thereon a plurality of display regions from the first region to the n-th region, the background region, snooze intervals corresponding to the respective regions, boundaries between adjacent regions, the current time, a clock image indicating the current time, and letters showing an alarm. Specifically, when a user touches the touch panel 111, a touch event happens. The control unit 140 may identify touch coordinates from a touch event, retrieve a specific region linked to the touch coordinates from the region table 122, and perform a particular function corresponding to the specific region. If the identified touch coordinates are linked to a snooze reset icon (i.e., in case of the yes branch of operation S209), the above-discussed operation S211 is performed.

At operation S213, the control unit 140 may determine whether a drag input subsequent to a touch input on a snooze reset icon is received. If there is no drag input subsequent to a touch input, e.g., if a touch input is released from a snooze reset icon ('NO'), at operation S213, the control unit 140 may return to operation S203. Otherwise, if a drag input subsequent to a touch input is received (YES'), at operation S213, the control unit 140 may select a specific one region corresponding to the end point of a drag among the first region to the n-th region and the background region. Meanwhile, two or more drag inputs may be received continuously. For example, after a first input dragged from a snooze reset icon to a first selected region of display regions is received and without releasing the first drag input a second input from the first selected region to a second selected region is received, the second drag input may be released at the second selected region. In such cases, a specific region selected by a drag input may be changed continuously and be finally selected depending on the end point of the final drag (i.e., released point). As such, for above-mentioned example, the second selected region may be finally selected as the specific region.

At operation S217, the control unit 140 may check whether the selected region is the background region. As discussed above, the background region is the remaining region other than the first region to the n-th region. Also, each of the first to n-th regions may be displayed in the form of a circle, an ellipse, a quadrangle, and the like. In some various embodiments, the background region may not exist, or a snooze function may be not available in the background region. In the former case, a plurality of display regions may completely constitute the entire screen without the background region. In both cases, one of display regions may replace the background region.

If the background region is selected by a drag input ('YES'), in operation S217, the control unit 140 may determine at operation S219 whether a touch input is maintained in the background region for a certain duration. If so ('YES'), in operation S219, the control unit 140 may increase a snooze interval in proportion to a touch input duration at operation S221 and also control the memory unit 120 to store the increased snooze interval therein. A snooze interval prior to such an increase may be a default snooze interval or a specific snooze interval initially assigned to the background region by a designer or a user. For example, if a default snooze interval is set to three minutes, a snooze interval may be gradually increased from three minutes in proportion to a touch input duration on the background region. Alternatively, if an initial snooze interval is set to twenty minutes, a snooze interval may be gradually increased from twenty minutes in proportion to a touch input duration on the background region. Additionally, this increasing snooze interval may be restricted to a specific duration. For example, if the upper limit of a snooze interval is set to sixty minutes, a snooze interval may be increased again from zero, a default snooze interval, or an initial snooze interval assigned to the background region when an increasing snooze interval exceeds sixty minutes. In such cases, the timer 123 may create necessary time data under the control of the control unit 140, and such time data may be used for a count operation. After operation S221, when a touch release input is received, the control unit 140 may reset at operation S227 a snooze interval to a specific snooze interval which is increased in proportion to a touch input duration on the background region and stored in the memory unit 120.

If there is no touch input maintained in the background region for a certain duration ('NO'), in operation S219, the control unit 140 may control at operation S223 the memory unit 120 to store a default snooze interval or an initial snooze interval assigned to the background region. Thereafter, when a touch release input is received, the control unit 140 may reset at operation S227 a snooze interval to a specific snooze interval stored in the memory unit 120.

Meanwhile, if the selected region is not the background region ('NO'), in operation S217, namely if one of the first to the n-th regions is selected, a specific snooze interval corresponding to the selected region may be stored and displayed at operation S225. In this case, snooze intervals corresponding to non-selected regions may be not displayed, and only a specific snooze interval corresponding to the selected region may be displayed. Further, a number indicating this specific snooze interval may be displayed with a greater size than a number of a snooze interval earlier displayed at operation S211 when a snooze reset icon is touched. Also, the selected region may be displayed with a specific semitransparent color so as to be distinguishable from the other regions. Alternatively, any interposed regions between the selected region and the snooze reset icon may also be displayed with a semitransparent color. Thereafter, when a touch release input is received, the control unit 140 may reset at operation S227 a snooze interval to a specific snooze interval stored in the memory unit 120.

FIGS. 3A to 3D are screenshots illustrating a method for setting a snooze interval according to an embodiment of the present disclosure.

Figure 3A:
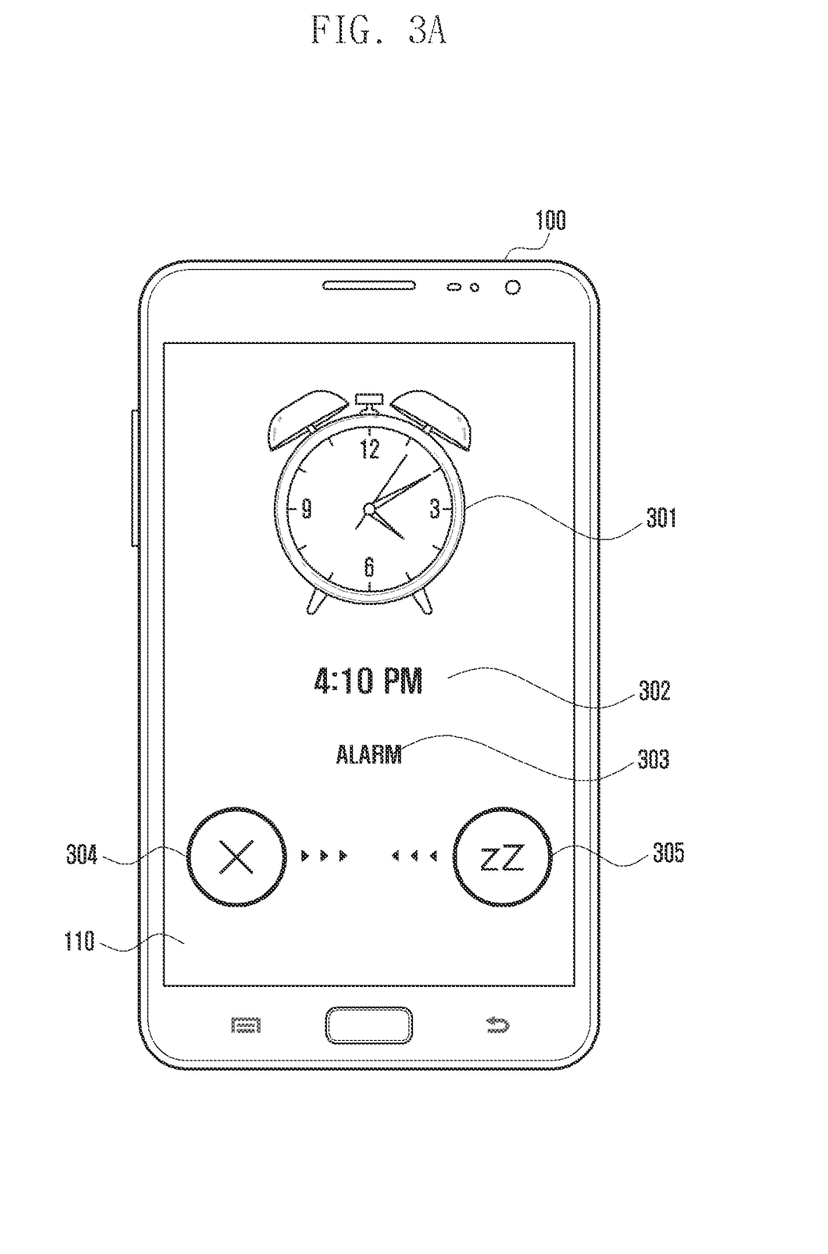
FIGS. 3A, 3B, 3C, and 3D are screenshots illustrating a method for setting a snooze interval according to an embodiment of the present disclosure.

FIG. 3A illustrates a state in which an alarm is outputted when an alarm time occurs. Referring to FIG. 3A, the touch screen 110 of the mobile device 100 may display a clock image 301 indicating the current time, the current time 302, letters 303 showing an alarm, an alarm cancel icon 304, and a snooze reset icon 305. When a user touches and drags the alarm cancel icon 304, an alarm and snooze function may be canceled.

Figure 3B:
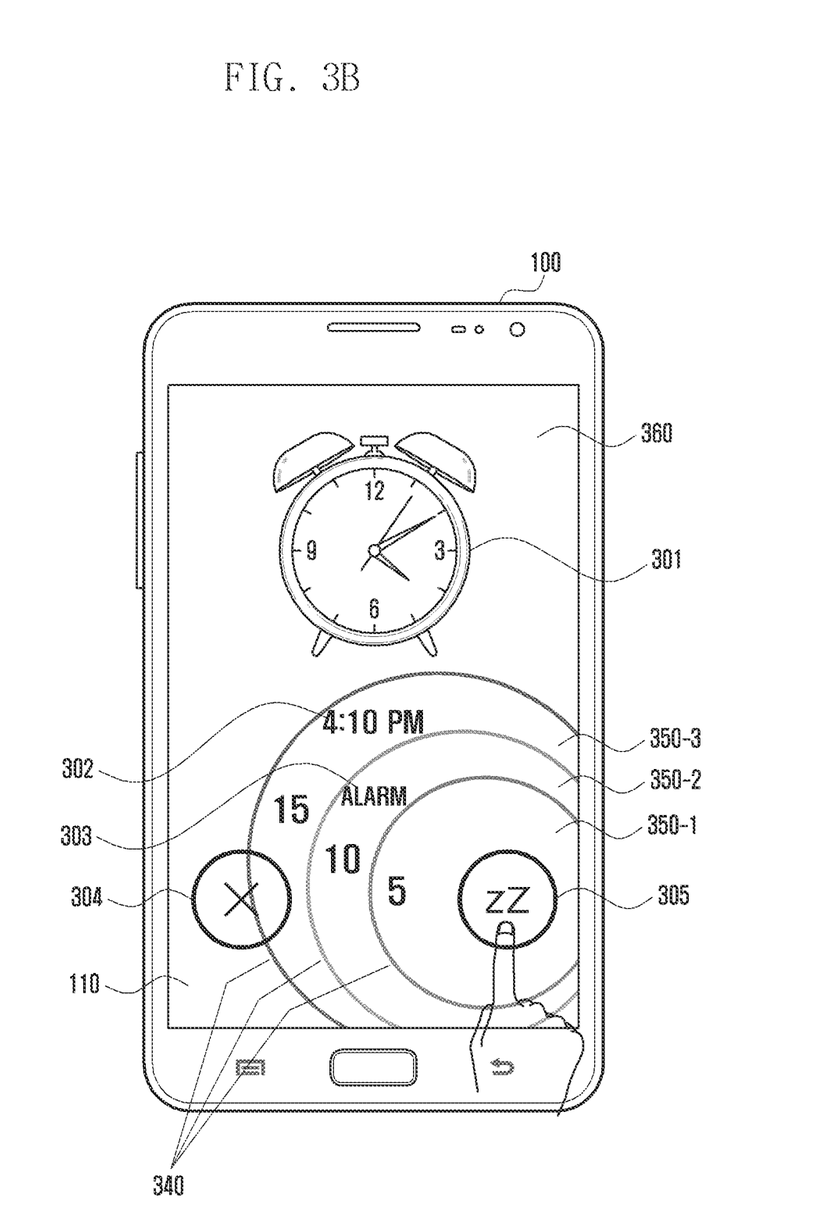

FIG. 3B illustrates a screenshot displayed when a user touches the snooze reset icon 305. Referring to FIG. 3B, the touch screen 110 may display the first region 350-1, the second region 350-2, the third region 350-3, the background region 360, boundaries 340 between adjacent regions, and numbers indicating snooze intervals corresponding to respective regions. As shown, respective snooze intervals of the first region 350-1, the second region 350-2 and the third region 350-3 are five minutes, ten minutes and fifteen minutes, for example. Assigned to the background region 360 may be a default snooze interval or any specific snooze interval initially set by a designer or a user. The first to third regions 350-1, 350-2 and 350-3 may be arranged in an adjoining form as if concentric circles having different sizes overlap. Although each region is displayed in the form of a circle in FIG. 3B, any other shape such as an ellipse or a quadrangle may be alternatively used for such regions.

Figure 3C:
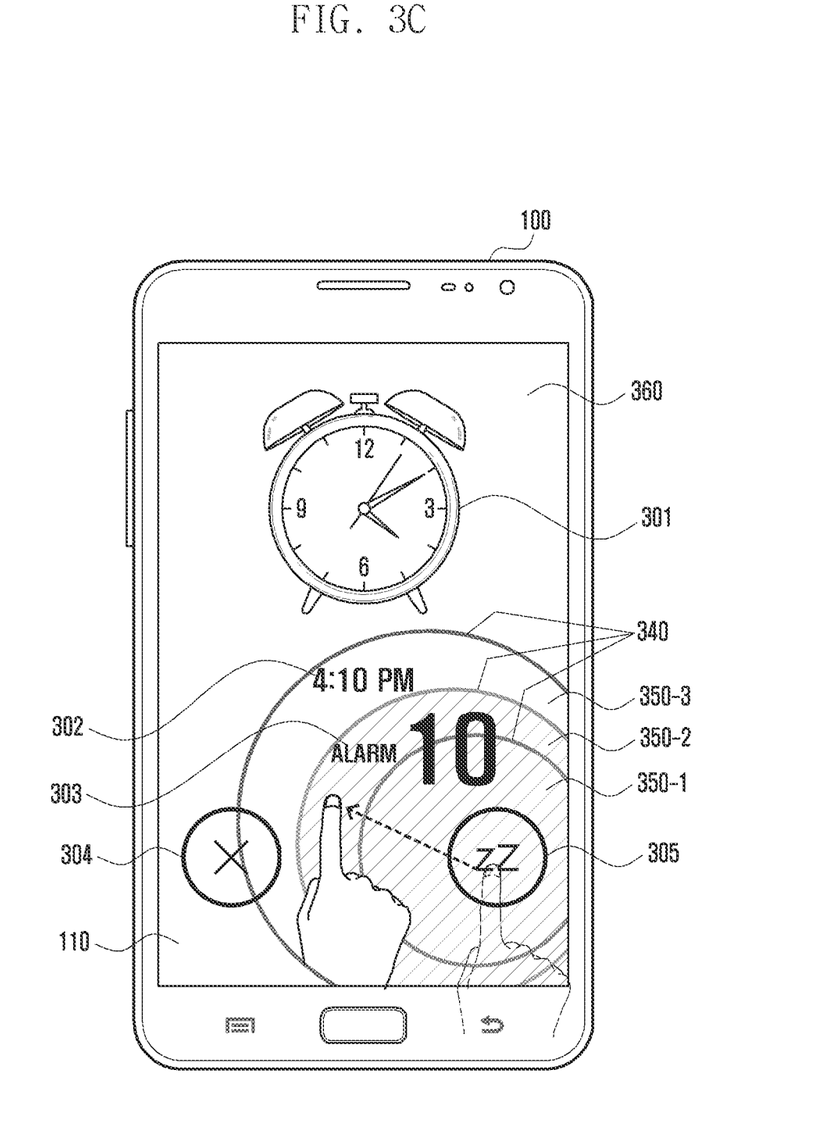

FIG. 3C illustrates a screenshot displayed in response to a user's drag input toward the second region 350-2. Namely, the second region 350-2 is selected by means of a drag input. The number '10' that indicates a snooze interval corresponding to the second region 350-2 may be displayed with an increased size to the corresponding number in FIG. 3B.

Figure 3D:
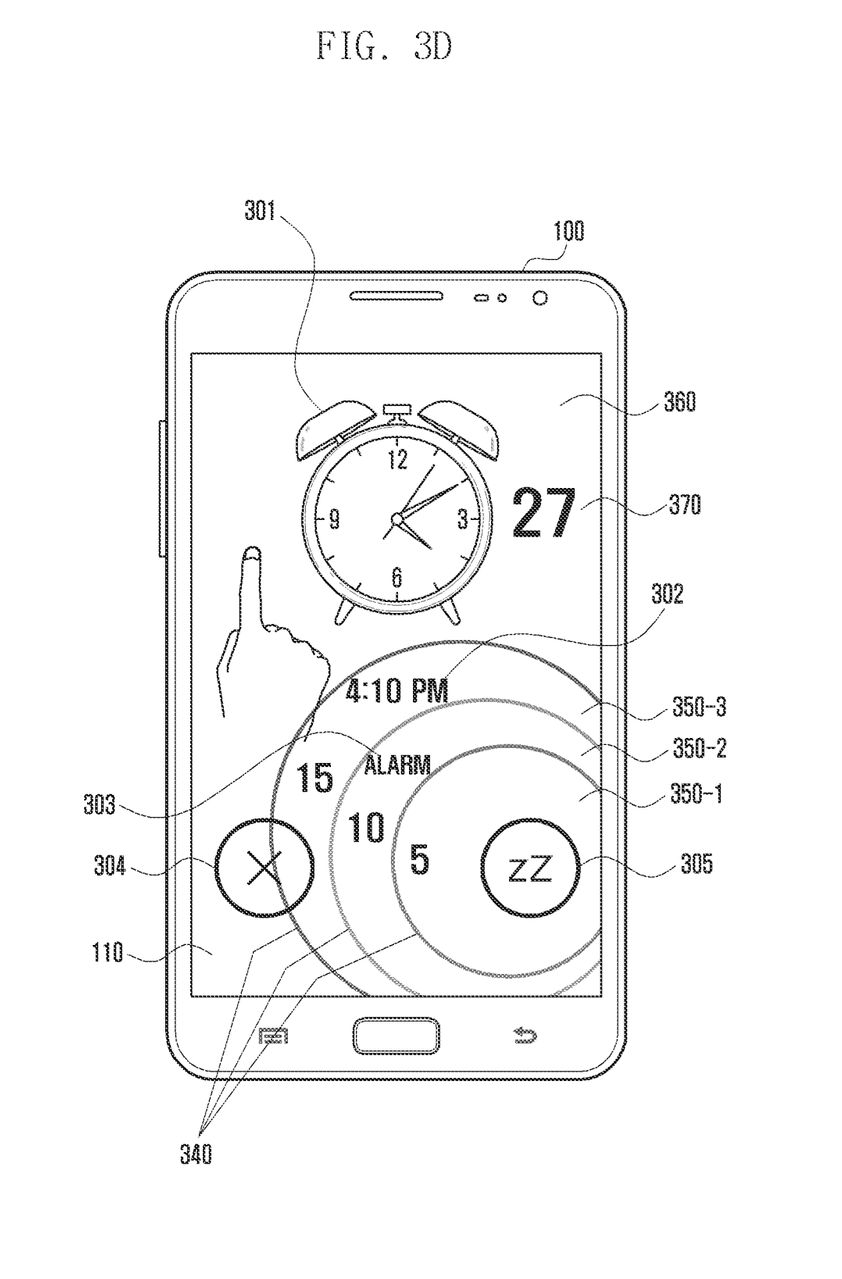

FIG. 3D illustrates a screenshot displayed when a touch input is maintained in the background region 360 for a specified duration. Namely, when a user select the background region 360 by means of a drag input and then maintains a touch on the background region 360 for a certain duration, the touch screen 110 may display a gradual increase of a snooze interval from a default snooze interval. For example, if a user maintains a touch on the background region 360 for a while, the touch screen 110 may display continuously an increasing snooze interval 370, e.g., 27 minutes. This snooze interval is stored in the memory unit 120. When a touch is released, a snooze interval is reset to the stored snooze interval.

Figure 4A:
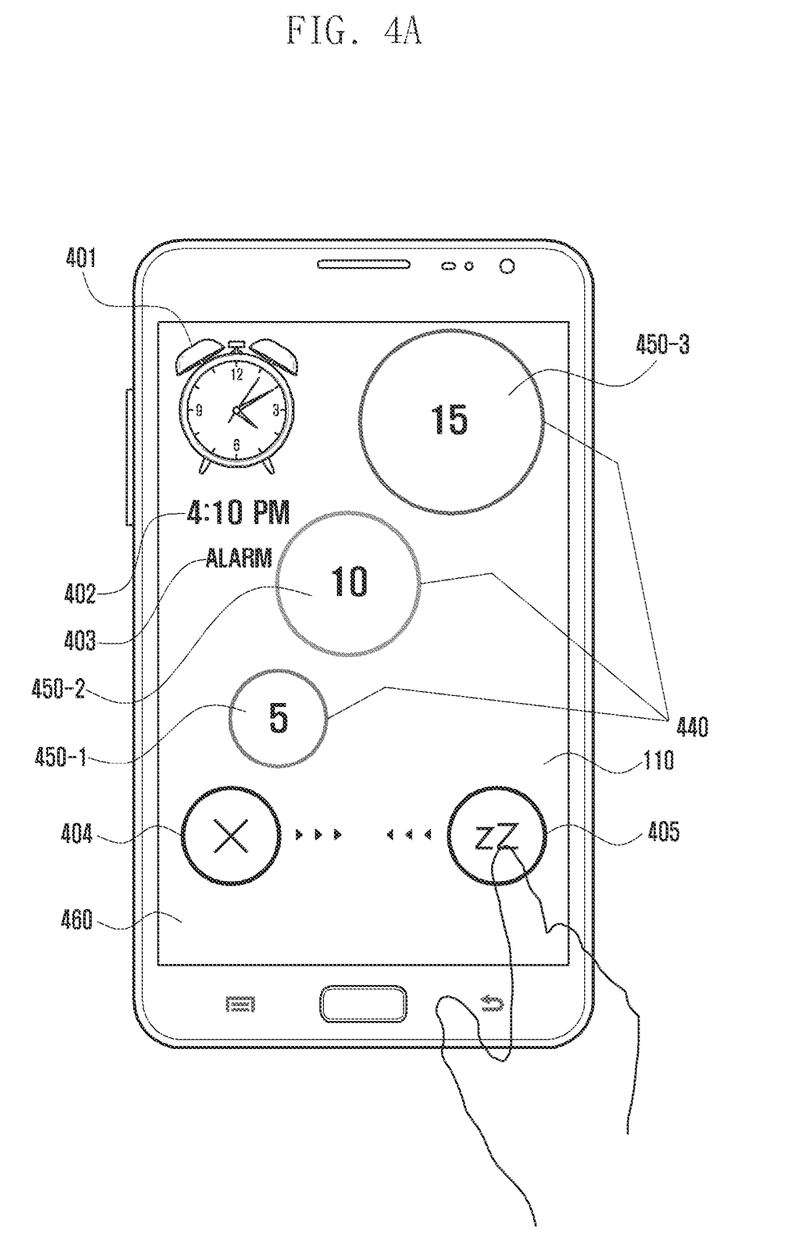
FIGS. 4A, 4B, and 4C are screenshots illustrating a method for setting a snooze interval according to another embodiment of the present disclosure.
Figure 4B:
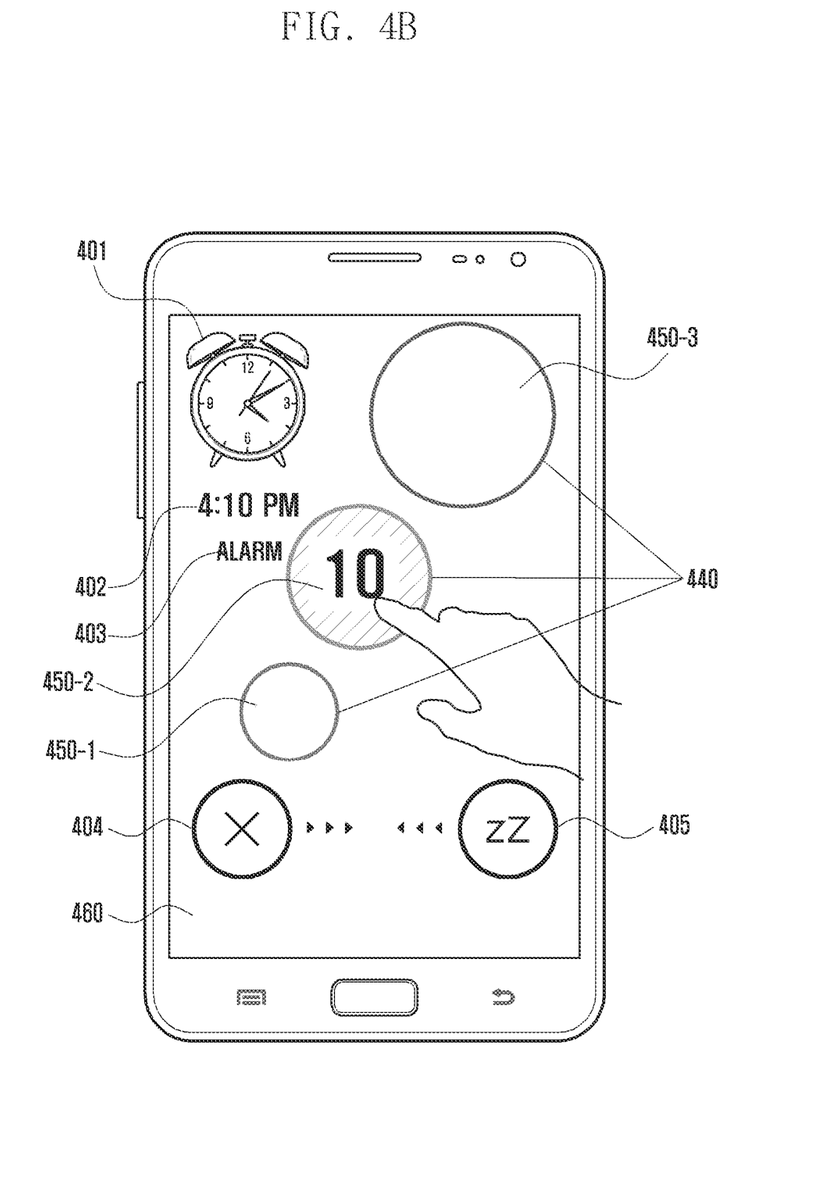
Figure 4C:
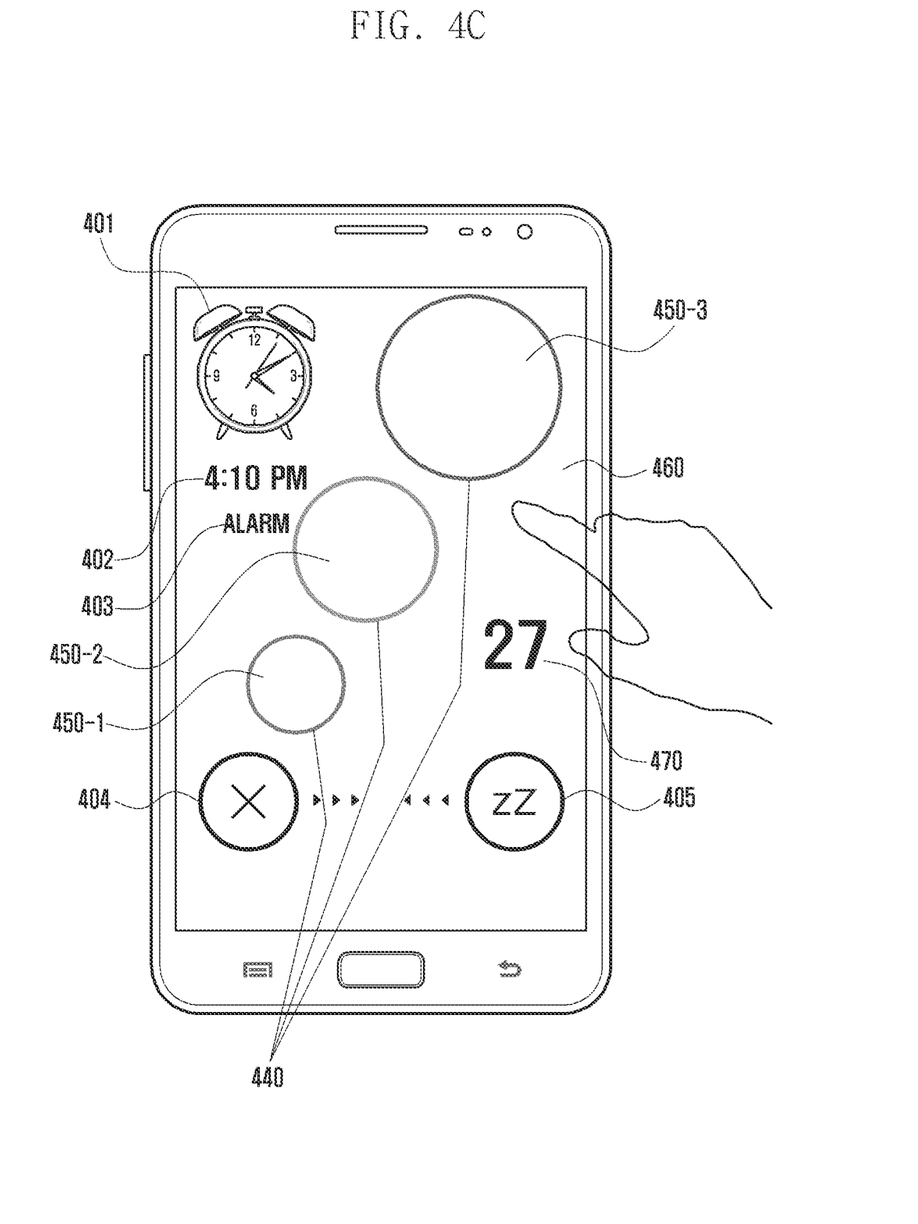

FIGS. 4A to 4C are screenshots illustrating a method for setting a snooze interval according to another embodiment of the present disclosure.

FIG. 4A illustrates a screenshot displayed in response to a touch on a snooze reset icon. As discussed in FIGS. 3A and 3B, the touch screen 110 may display a clock image 401 indicating the current time, the current time 402, letters 403 showing an alarm, an alarm cancel icon 404, and a snooze reset icon 405. When the snooze reset icon 405 is touched, the touch screen 110 may display the first region 450-1, the second region 450-2, the third region 450-3, the background region 460, boundaries 440 between the background region 460 and each of the first to third regions, and numbers indicating snooze intervals corresponding to respective regions. Unlike FIG. 3 case, the respective display regions 450-1, 450-2 and 450-3 are separated from each other rather than overlapping.

FIG. 4B illustrates a screenshot displayed in response to a user's drag input. When a user touches the snooze reset icon 405 and drags toward the second region 450-2, the number '10' that indicates a snooze interval corresponding to the second region 450-2 may be displayed.

FIG. 4C illustrates a screenshot displayed when a touch input is maintained in the background region 460 for a certain duration. Namely, when a user select the background region 460 by means of a drag input and maintains a touch on the background region 460 for a certain duration, the touch screen 110 may display a gradual increase of a snooze interval from a default snooze interval. For example, if a user maintains a touch on the background region 460 for a while, the touch screen 110 may display continuously an increasing snooze interval 470, e.g., 27 minutes as shown. This snooze interval is stored in the memory unit 120. When a touch is released, a snooze interval is reset to the stored snooze interval.

As fully discussed hereinbefore, some regions linked to different snooze intervals are displayed in response to a simple touch input together with the background region for allowing a gradual increase of a snooze interval. Therefore, a user can easily change and reset a snooze interval through a simple user interface.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for setting a snooze interval in a mobile device, the method comprising:
    receiving a touch event on a snooze reset icon for setting a snooze function during a time when a preset alarm goes off;
    outputting, upon receiving the touch event during the time when the preset alarm goes off, a plurality of display regions for receiving input respectively corresponding to a plurality of snooze intervals, each of the display regions having a display area size in proportion to a respective snooze interval;
    selecting, in response to a single dragging of the touch event starting from the snooze reset icon directly to one display region of the plurality display regions, the one display region of the plurality display regions; and
    setting the snooze function with a specific snooze interval corresponding to the selected display region.

2. The method of claim 1, further comprising:
    outputting, after selecting the one display region, a specific color or number corresponding to the selected one display region with the selected one display region other than a specific color or number corresponding to a non-selected display region,
    wherein the number indicates a snooze interval corresponding to the selected one display region and is displayed with a greater size than a number of a snooze interval displayed when outputting the plurality of display regions.

3. The method of claim 1, wherein the plurality of display regions are separated from each other.

4. The method of claim 1, wherein the plurality of display regions further include a background region.

5. The method of claim 4, further comprising:
    when the background region is selected with a long press input, gradually increasing the specific snooze interval in proportion to a duration of time of the long press input maintained on the background region from at least one of a default snooze interval or a snooze interval assigned to the background region.

6. The method of claim 1, wherein the touch event for setting the snooze function includes a touch input on a snooze reset icon.

7. The method of claim 6, wherein one of the display regions is selected in response to a drag input from the snooze reset icon to the selected one display region.

8. The method of claim 7, wherein the snooze function is set in response to a touch release input from the selected one display region.

9. The method of claim 1, further comprising:
    setting a plurality of initial snooze intervals respectively corresponding to the plurality of display regions.

10. An apparatus for setting a snooze interval in a mobile device, the apparatus comprising:
    a touch screen configured to:
        receive a touch event on a snooze reset icon for setting a snooze function during a time when a preset alarm goes off, and
        display a plurality of display regions for receiving input respectively corresponding to a plurality of snooze intervals during the time when then preset alarm goes off; and
    at least one processor configured to:
        control the touch screen to output, upon receiving the touch event, the plurality of display regions respectively corresponding to the plurality of snooze intervals, each of the display regions having a display area size in proportion to a respective snooze interval,
        select, in response to a single dragging of the touch event starting from the snooze icon directly to one display region of the plurality display regions, the one display region of the plurality of display regions, and
        set the snooze function with a specific snooze interval corresponding to the selected display region.

11. The apparatus of claim 10,
    wherein the at least one processor is further configured to control the touch screen to display, after selecting the one display region, a specific color or number corresponding to the selected one display region with the selected on display region other than a specific color or number corresponding to a non-selected display region, and
    wherein the number indicates a snooze interval corresponding to the selected one display region and is displayed with a greater size than a size of a number of a snooze interval displayed when outputting the plurality of display regions.

12. The apparatus of claim 11, wherein the plurality of display regions that are arranged in the adjoining form include a series of concentric circles, each outer circle of the series of concentric circles indicates a greater snooze interval than a snooze interval of an adjoining inner circle of the series of concentric circles.

13. The apparatus of claim 10, wherein the at least one processor is further configured to control the touch screen such that the plurality of display regions are separated from each other.

14. The apparatus of claim 10, wherein the at least one processor is further configured to control the touch screen to display a background region as one of the plurality of display regions.

15. The apparatus of claim 14, wherein the at least one processor is further configured to, when the background region is selected with a long press input, gradually increase the specific snooze interval in proportion to a duration of time of the long press input maintained on the background region from at least one of a default snooze interval or a snooze interval assigned to the background region.

16. The apparatus of claim 10, wherein the at least one processor is further configured to control the touch screen to display the plurality of display regions in response to a touch input on a snooze reset icon received from the touch panel.

17. The apparatus of claim 16, wherein the at least one processor is further configured to select one of the display regions in response to a drag input from the snooze reset icon to the selected one display region.

18. The apparatus of claim 17, wherein the at least one processor is further configured to set the snooze function in response to a touch release input from the selected one display region.

19. The apparatus of claim 10, wherein the at least one processor is further configured to set an initial plurality of snooze intervals respectively corresponding to the plurality of display regions.

* * * * *